United States Patent [19]
Davis et al.

[11] Patent Number: 5,364,012
[45] Date of Patent: Nov. 15, 1994

[54] METHOD OF PRODUCING METAL ENCAPSULATED PLASTIC TANK SYSTEMS

[75] Inventors: Gail F. Davis; Joe B. Kersey, both of Duncan, Okla.

[73] Assignee: Halliburton Company, Duncan, Okla.

[21] Appl. No.: 48,449

[22] Filed: Apr. 16, 1993

[51] Int. Cl.$^5$ .................... B23K 5/22; B23K 101/12; B65D 25/18
[52] U.S. Cl. .................... 228/184; 228/189; 228/216; 220/565; 220/410
[58] Field of Search ............. 228/216, 184, 189, 50; 220/565, 402, 403, 410

[56] References Cited

U.S. PATENT DOCUMENTS

| | | | |
|---|---|---|---|
| 1,961,117 | 5/1934 | Wall | 228/216 |
| 2,071,330 | 2/1937 | Buchholz | 280/5 |
| 2,792,626 | 5/1957 | Chyle | 228/50 |
| 3,158,383 | 11/1964 | Anderson et al. | 280/5 |
| 3,163,435 | 12/1964 | Krueger et al. | 280/5 |
| 3,604,719 | 9/1971 | Kerr | 280/5 |
| 3,840,139 | 10/1974 | Harmon | 220/3 |
| 3,843,010 | 10/1974 | Morse et al. | 220/3 |
| 4,241,843 | 12/1980 | Walker et al. | 228/184 |
| 4,452,375 | 6/1984 | Marcus | 220/458 |
| 4,613,535 | 9/1986 | Harpell et al. | 428/113 |
| 4,625,892 | 12/1986 | Carlin, Jr. | 220/465 |
| 4,817,817 | 4/1989 | Palazzo | 220/445 |
| 5,000,342 | 3/1991 | Sharp | 220/454 |
| 5,046,638 | 9/1991 | Wolf | 220/410 |

FOREIGN PATENT DOCUMENTS 81010258 10/1972 Japan.

Primary Examiner—P. Austin Bradley
Assistant Examiner—Jeanne M. Elpel
Attorney, Agent, or Firm—Stephen R. Christian; Dennis D. Brown

[57] ABSTRACT

A method of forming a tank system and a tank system formed thereby wherein the tank system comprises a plastic tank covered by a metal shell. The inventive method comprises the steps of: (a) covering a first portion of the plastic tank with a first metal shell piece having a first edge wherein the interior shape of the first metal shell piece corresponds to the exterior shape of the first portion of the plastic tank such that the exterior surface of the plastic tank is positioned in close proximity to the interior surface of the first metal shell piece; (b) covering a second portion of the plastic tank with a second metal shell wherein the interior shape of the second metal shell piece corresponds to the exterior shape of the second portion of the plastic tank such that the exterior surface of the plastic tank is positioned in close proximity to the interior surface of the second metal shell piece, and wherein the second metal shell piece has a second edge corresponding to the first edge of the first metal shell piece such that, when the first and second shell pieces are placed over the plastic tank, the second edge is positioned adjacent the first edge; and (c) welding the first and second shell pieces together along the first and second edges.

18 Claims, 11 Drawing Sheets

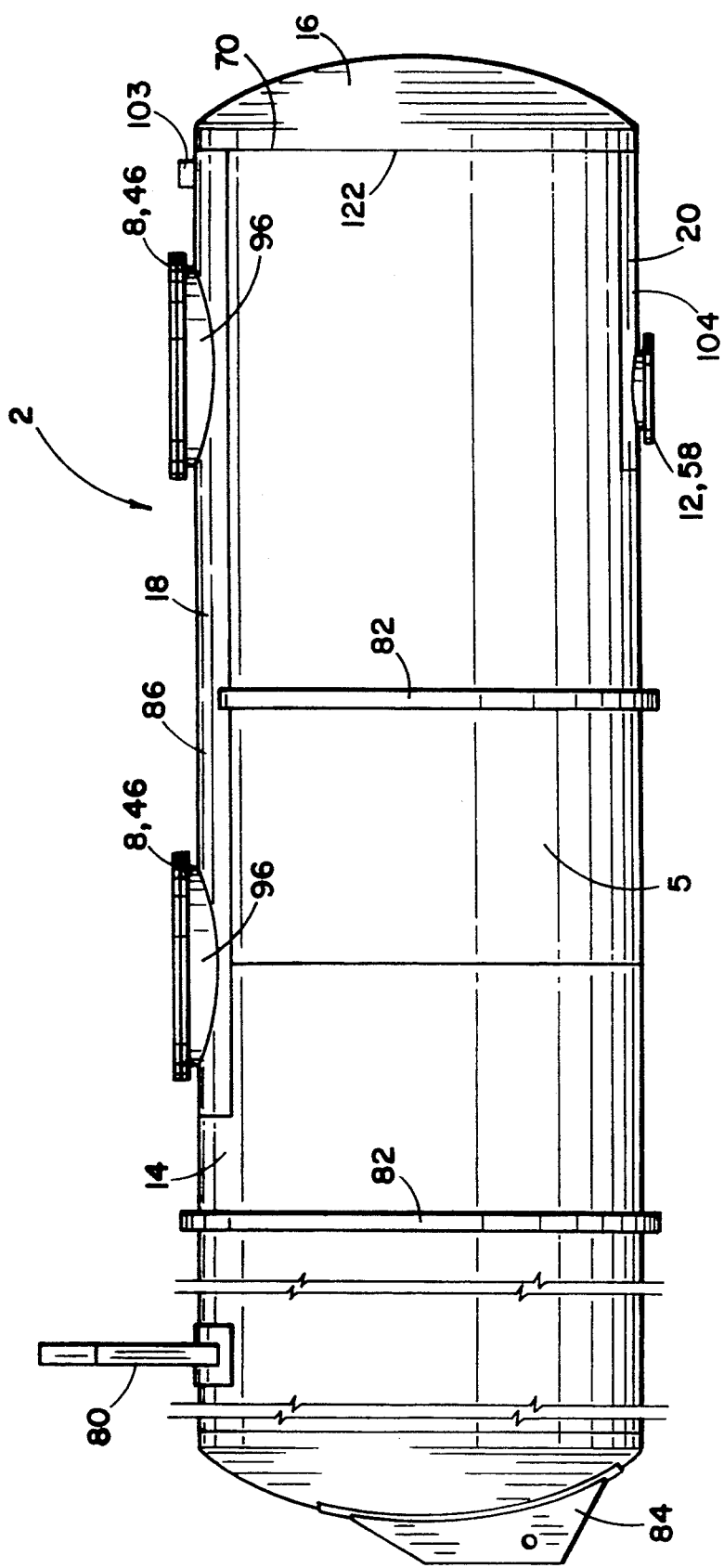

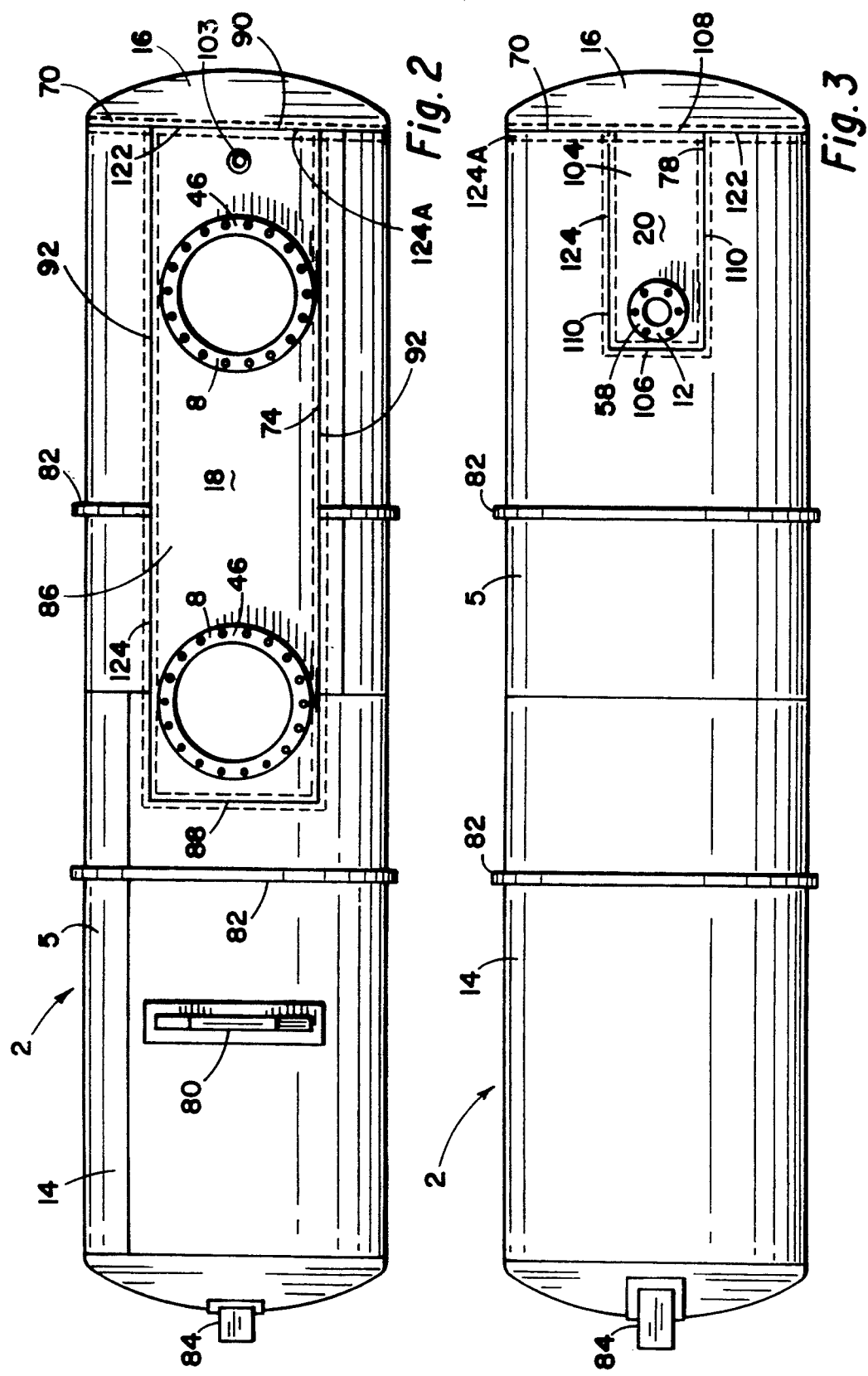

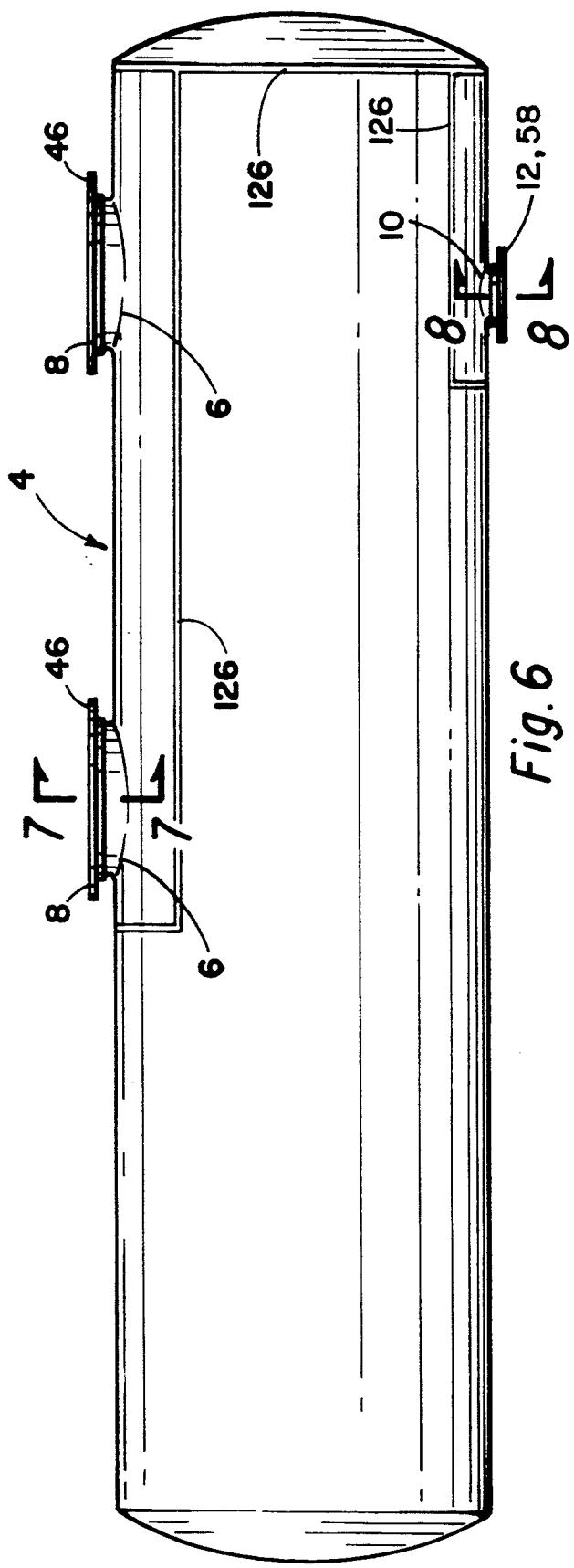
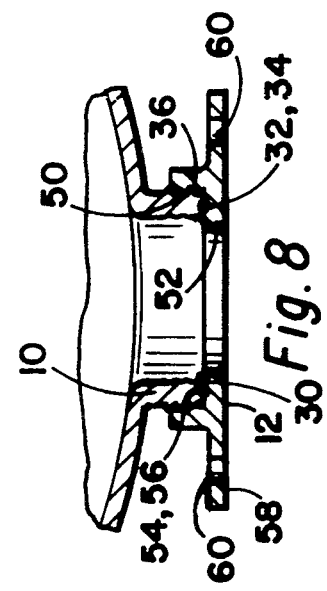
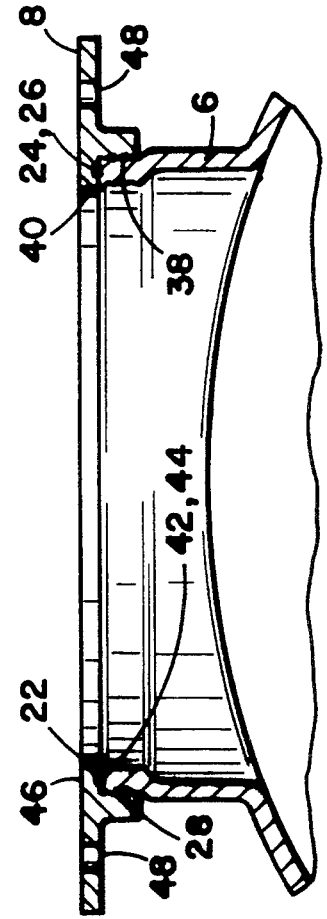
Fig. 6
Fig. 8
Fig. 7

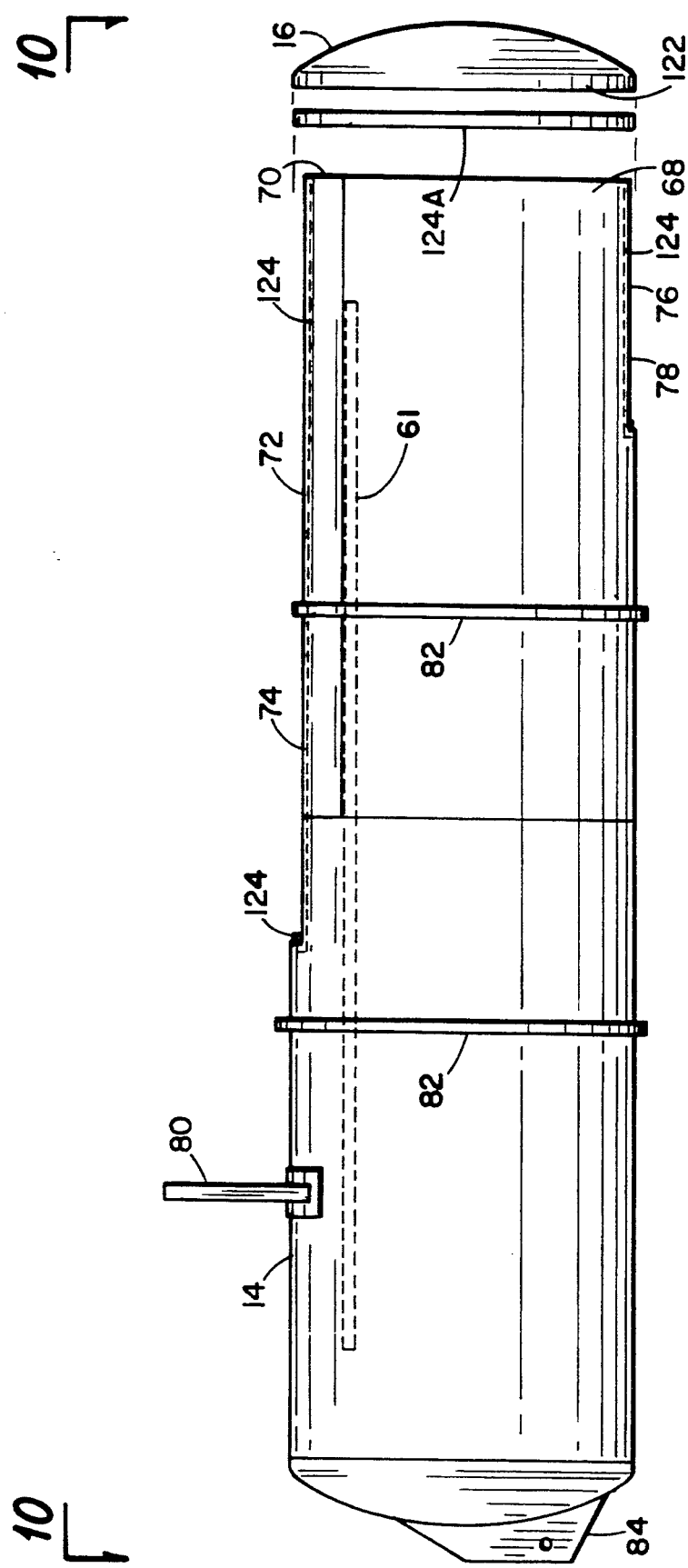

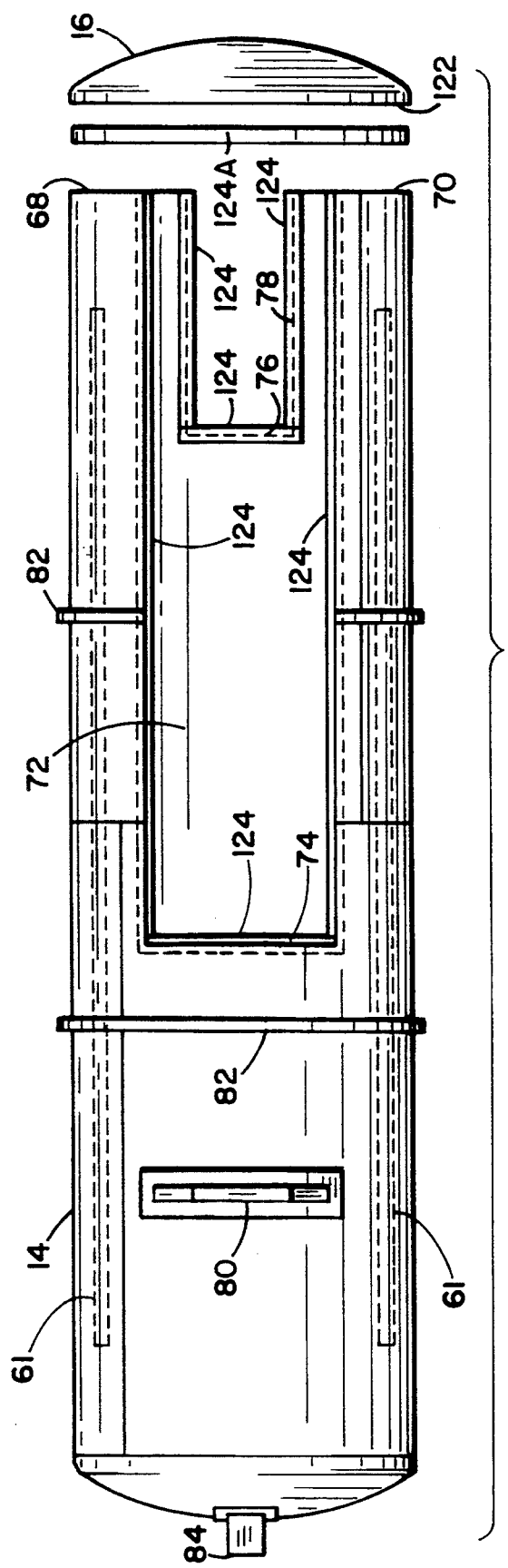
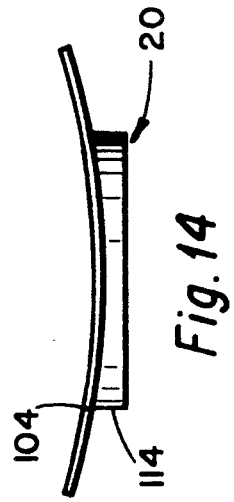
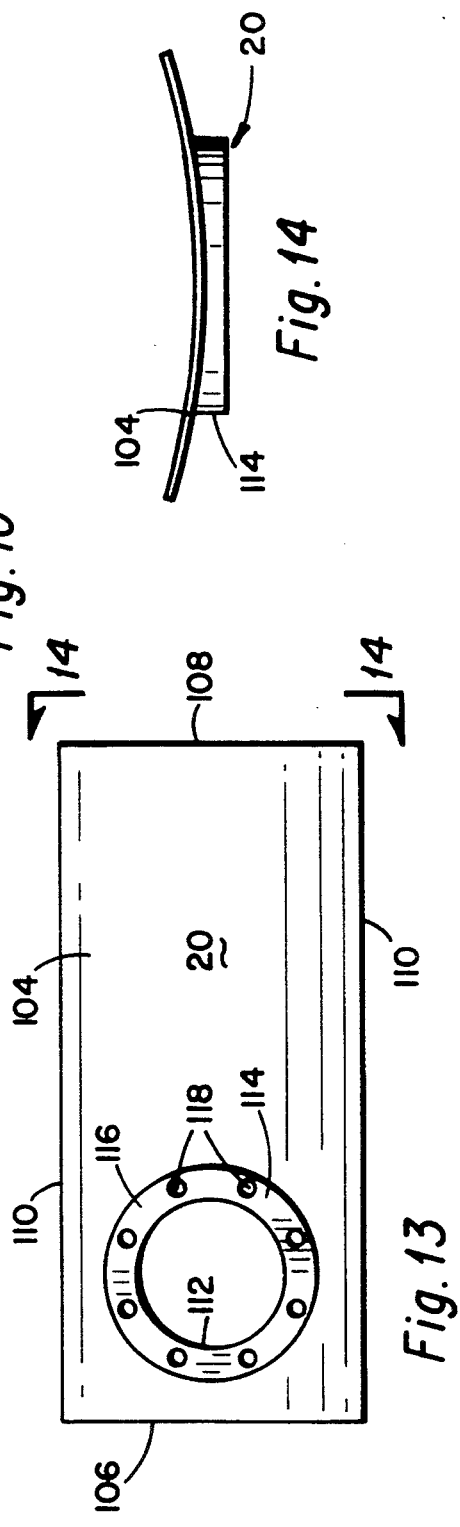

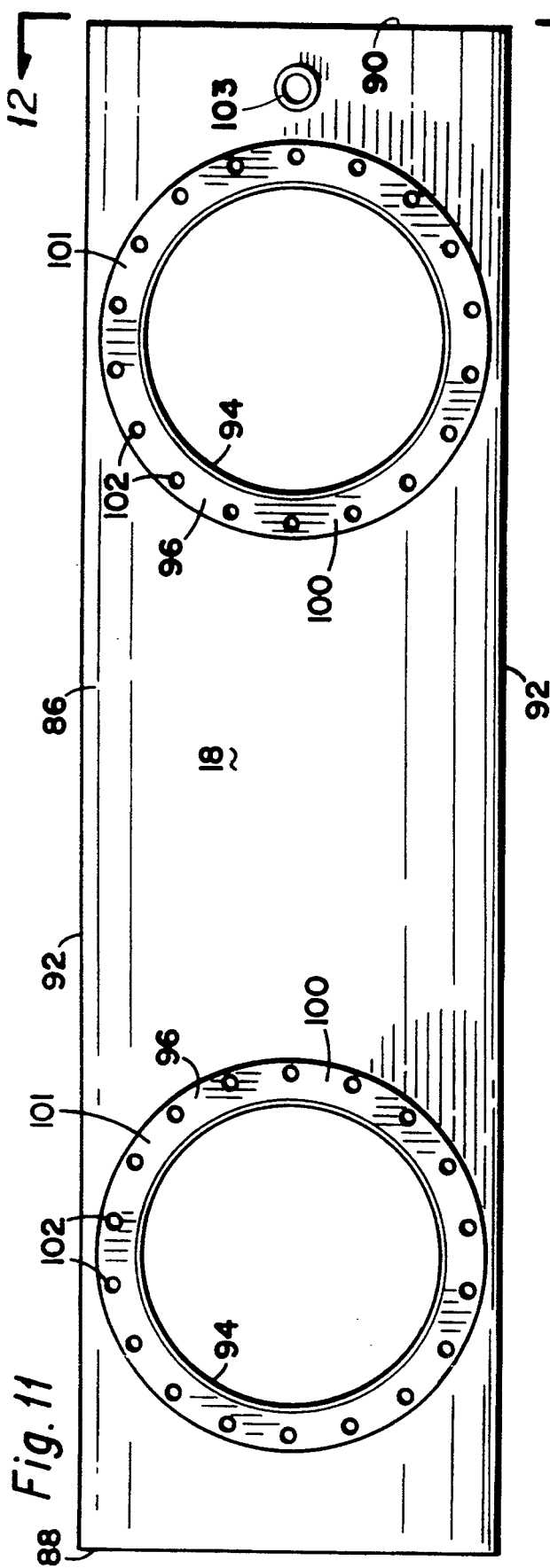
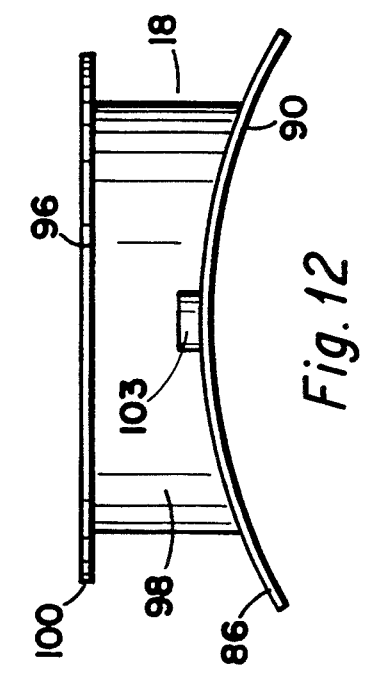
Fig.11
Fig.12

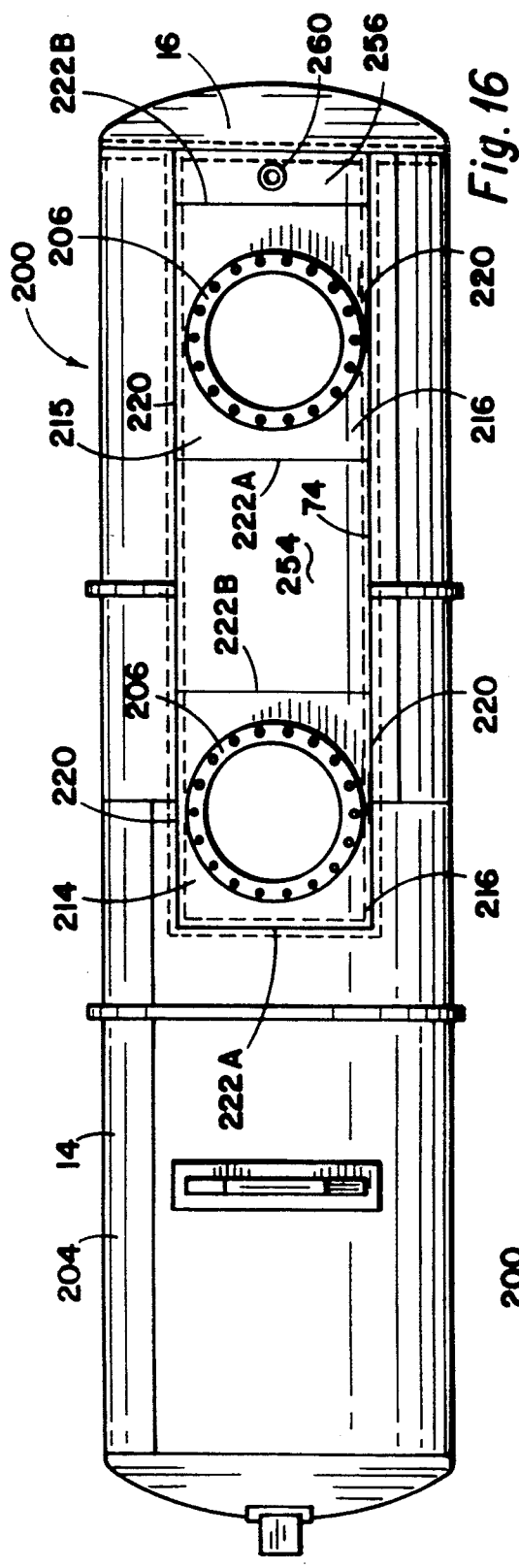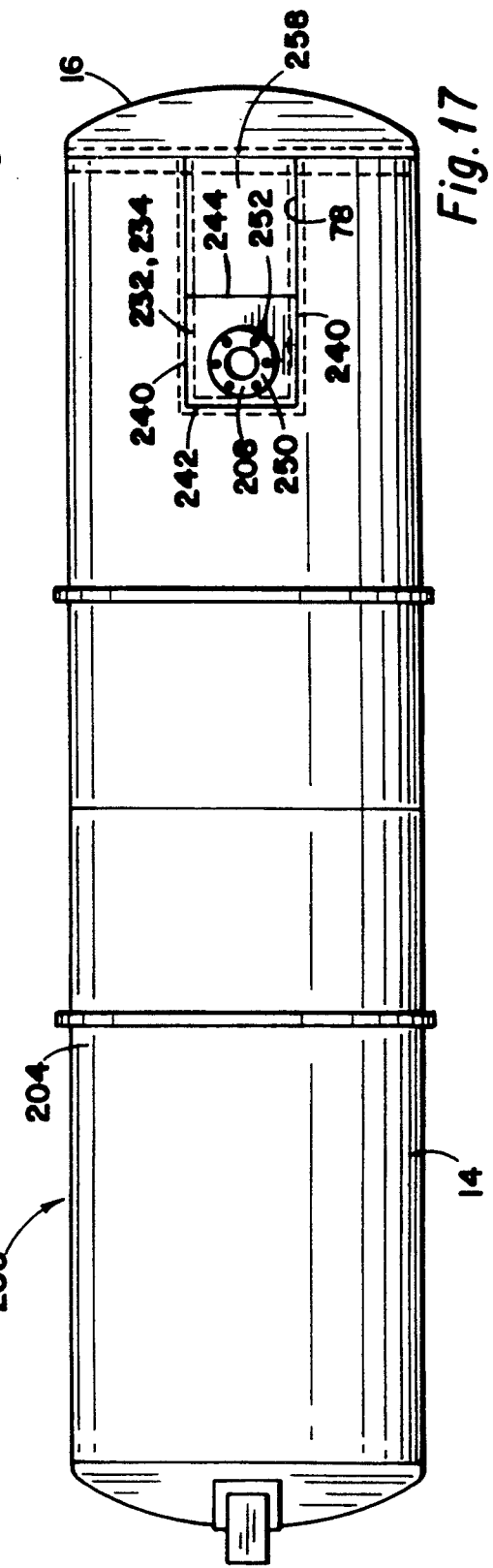

5,364,012

METHOD OF PRODUCING METAL ENCAPSULATED PLASTIC TANK SYSTEMS

FIELD OF THE INVENTION

The present invention relates to metal encapsulated plastic tanks and to methods of producing metal encapsulated plastic tanks.

BACKGROUND OF THE INVENTION

All-metal tanks (e.g., stainless steel tanks) have been widely used for storing and transporting various chemicals and chemical compositions. All-metal tanks can readily be formed which will accommodate internal vacuum and/or high pressure conditions. All-metal tanks can also be readily formed which are sturdy enough to withstand the general mechanical stresses encountered in loading, unloading, stacking, transporting, minor collisions, etc.

Unfortunately, all-metal tanks are generally very heavy and expensive to build. In many applications (e.g., the storage and/or transportation of acids and other well treating fluids), all-metal tanks are also susceptible to internal corrosive chemical attack. Although, in such applications, certain metallic materials of construction can often be selected which are compatible with the corrosive chemical compositions being stored and/or transported, such materials of construction can be exotic and/or expensive.

Certain elastomers, polyolefins, rubber materials, and the like are highly resistant to corrosive chemical attack. Such materials are readily available, are lightweight, and can be comparatively inexpensive. However, tanks formed from these materials are generally susceptible to mechanical damage.

To alleviate the above-mentioned problems encountered in the use of all-metal tanks and to obtain the advantages of both the metallic and the nonmetallic materials of construction mentioned above, lined metal tanks have been produced which are compatible with the chemical compositions being stored and/or transported therein. These lined tanks have generally consisted of either (1) a metallic tank having a lining adhered to its interior surface or (2) a metallic tank having a thin, flexible bladder inserted therein.

A plastic or rubber lining material can be applied to the interior wall of a metal tank by securing sheets of the lining material to the interior wall using a bonding agent. However, when a lining material is bonded to the interior wall of a metallic tank in this manner, the resulting liner includes undesirable seams, joints, and other regions of non-uniform thickness.

A liner can also be secured to the interior wall of a metal tank by spraying a liquid plastic material thereon. However, when a liquid lining material is sprayed onto the interior surface of a metal tank, it is difficult to ensure that the resulting liner will be free of voids, pinholes, or other defects. Such defects leave the metallic shell exposed to corrosive chemical attack.

It is also noted that, whenever a lining is attached to the interior surface of a metallic tank by either bonding or spraying, tearing or splitting of the liner can occur as a result of thermal expansion and contraction due to the disparate coefficients of thermal expansion of the liner and the metallic shell. An attached liner is also easily ruptured by physical blows to the exterior of the metallic shell.

Tanks having bladder-type plastic linings, on the other hand, have proven to be unsatisfactory for most applications. Thin, flexible, plastic bladders can be easily damaged even during routine filling, handling, and cleaning operations.

U.S. Pat. No. 4,625,892 discloses a tank system composed of a rigid, linear low density polyolefin tank mounted within a metallic tank. The polyolefin tank is not bonded to the interior wall of the metallic tank. Since, for the most part, the inner polyolefin tank and the outer metallic tank are free to expand and contract independently of each other, the amount of stress imparted to the plastic tank as a result of thermal expansion and contraction is greatly reduced. Further, since the inner plastic tank is not adhered to the outer metallic tank, the likelihood that the inner plastic tank will be damaged by a blow to the exterior of the metallic tank is reduced.

The tank system of U.S. Pat. No. 4,625,892 is produced by forming a linear, low density, polyolefin tank inside an outer metallic tank using a rotational molding (rotomolding) technique. This rotational molding technique includes the steps of: (1) applying a high temperature paint or other release agent to the inner walls of the metallic tank; (2) heating the metallic tank; (3) placing a polyolefin powder (or liquid) inside the heated metallic tank; (4) rotating and continuing to heat the metallic tank such that the polyolefin powder melts and coats the inner walls of the metallic tank; (5) cooling the metallic tank so that the plastic tank formed therein solidifies and shrinks away from the interior surface of the metallic tank; and (6) during the cooling cycle, pressurizing the interior of the plastic inner tank such that the amount of inner tank shrinkage produced during the cooling cycle is minimized.

As part of the production method of U.S. Pat. No. 4,625,892, fixtures are also attached to the flanges and other connections of the metallic tank so that the melted polyolefin material is allowed to flow through the tank fittings and to coat one or more of the outer surfaces of the metallic tank connections. Thus, complete polyolefin connections corresponding to the connections of the metallic tank are formed in the inner polyolefin tank during the rotational molding process. To ensure that the outer metallic material is completely isolated from the contents of the inner plastic tank, the inner tank connections can be sealed along with the connections of the outer metallic tank using polyolefin-lined closures.

Unfortunately, the tank system of U.S. Pat. No. 4,625,896 has substantial shortcomings. The plastic connections formed in the inner plastic tank during the rotomolding process of U.S. Pat. No. 4,625,896 cover and extend over the connections of the outer metal tank. Due to the resulting intimate relationship between the connections of the plastic tank and the metallic tank, the connection areas of the plastic tank are subjected to substantial stress when the plastic tank shrinks away from the outer metal tank during the cooling cycle of the rotomolding process.

Substantial stress can also be imparted to the plastic inner tank of U.S. Pat. No. 4,625,892, and particularly to the connection areas of said inner tank, due to movement of the inner plastic tank within the outer metal tank during loading, transporting, unloading, etc. As indicated above, a substantial gap is created between the exterior wall of the plastic tank and the interior wall of the metal tank due to shrinkage during the rotomolding cooling cycle. Particularly large gaps will typically be created between the longitudinal exterior ends of the plastic tank and the longitudinal interior ends of the metal tank. Thus, the plastic tank is undesirably allowed to flex and move within the metal tank when material is added to or taken out of the tank system and when the tank system payload shifts within the plastic tank.

In tank systems of the type described in U.S. Pat. No. 4,625,892, attempts have been made to restrict the movement of the plastic tank within the metal tank by injecting an expanding urethane foam into the gap existing between an exterior end of the plastic tank and the corresponding interior end of the metal tank. In order to allow the injection of the urethane material, a port consisting of an internally threaded pipe collar will typically be provided through the elongate cylindrical portion of the metal tank at a point immediately adjacent the end of the metal tank. After the plastic tank is formed in the metal tank, a hose is fed through the port and down to the bottom of the gap existing between the ends of the tanks. The urethane material is then delivered through the hose as the hose is slowly pulled out of the metal tank.

Unfortunately, although this urethane injection technique has been helpful, the degree to which the plastic tank is allowed to flex and move within the metal tank remains undesirably high.

SUMMARY OF THE INVENTION

The present invention provides a method of forming a tank system wherein the tank system comprises a plastic tank covered by a metal shell and the plastic tank has an exterior surface and an exterior shape. The inventive method comprises the steps of: (a) covering a first portion of the plastic tank with a first metal shell piece having an edge; (b) covering a second portion of the plastic tank with a second metal shell piece having an edge corresponding to the edge of the first metal shell piece such that, when the first and second shell pieces are placed over the plastic tank, the edge of the second shell piece is positioned adjacent the edge of the first shell piece; and (c) after steps (a) and (b), welding the first and second shell pieces together along said edges.

In the embodiment of the inventive method just described, each of the metal shell pieces has an interior shape and an interior surface. The interior shape of the first shell piece corresponds to the exterior shape of the first portion of the plastic tank such that, when the first shell piece is placed over the first portion of the plastic tank, the exterior surface of the first portion of the plastic tank is in close proximity to the interior surface of the first shell piece. The interior shape of the second metal shell piece corresponds to the exterior shape of the second portion of the plastic tank such that, when the second shell piece is placed over the second portion of the plastic tank, the exterior surface of the second portion of the plastic tank is in close proximity to the interior surface of the second shell piece.

The present invention also provides a tank system comprising (a) a metal shell having an interior surface and an interior shape and (b) a plastic tank covered by the metal shell. The plastic tank has an exterior surface and an exterior shape. The plastic tank is a tank which has been formed outside of the metal shell. The interior shape of the metal shell corresponds to the exterior shape of the plastic tank such that the exterior surface of the plastic tank is in close proximity to the interior surface of the metal shell.

In the inventive tank system just described, the metal shell comprises a first shell piece and a second shell piece. The first shell piece covers a first portion of the exterior surface of the plastic tank while the second shell piece covers a second portion of the exterior surface of the plastic tank. Each of the first and second shell pieces has an edge. The edge of the second shell piece corresponds to the edge of the first shell piece such that these edges are positioned adjacent each other. Further, the metal shell of the inventive apparatus is a shell which has been formed over the plastic tank by covering the first portion of the exterior surface of the plastic tank with the first shell piece and covering the second portion of the exterior surface of the plastic tank with the second shell piece and then welding the second shell piece to the first shell piece along the first and second shell piece edges.

The inventive tank apparatus and method provide significant advantages over tank systems and methods of the type disclosed in U.S. Pat. No. 4,625,892. The inventive method substantially avoids the stress and cracking problems encountered in the method of U.S. Pat. No. 4,625,892 due to inner tank shrinkage. By substantially ensuring that the plastic inner tank of the inventive tank system is not allowed to move within the metal shell, the present invention also alleviates problems related to inner tank movement. Further, the present invention allows the cost effective use of standard polyethylene tanks which can be encapsulated with metal shells having generally any desired external mountings, attachments, etc. Additionally, last minute changes and modifications can be made to the metal shell of the inventive apparatus at any time prior to encapsulation. Moreover, using the inventive method, the metal shell of the inventive apparatus can be welded in place on the exterior of the plastic inner tank in a manner such that the metal shell meets ASME code requirements but the plastic inner tank is not substantially damaged by the shell welding process.

Further objects, features, and advantages of the present invention will be readily apparent to those skilled in the art upon reference to the accompanying drawings and upon reading the following description of the preferred embodiments.

BRIEF DESCRIPTION OF THE DRAWINGS

FIG. 1 provides an elevational side view of an embodiment 2 of the tank system provided by the present invention.

FIG. 2 provides a top view of inventive tank system 2.

FIG. 3 provides a bottom view of inventive tank system 2.

FIG. 6 provides an elevational side view of a plastic inner tank 4 included in inventive tank system 2.

FIG. 7 provides a cutaway elevational side view of a threaded fitting 6 provided in plastic inner tank 4 and having a plastic flange member 8 threadedly connected thereto.

FIG. 8 provides a cutaway elevational side view of a threaded suction fitting 10 provided in plastic inner tank 4 and having a plastic flange member 12 threadedly connected thereto.

FIG. 9 provides an exploded elevational side view of a primary metal shell piece 14 and a metal end piece 16 of inventive tank system 2.

FIG. 10 provides an exploded top view of primary shell piece 14 and metal end piece 16.

FIG. 11 provides a top view of a top metal shell piece 18 included in inventive tank system 2.

FIG. 12 provides an elevational end view of top metal shell piece 18.

FIG. 13 provides a bottom view of a bottom metal shell piece 20 included in inventive tank system 2.

FIG. 14 provides an elevational end view of bottom shell piece 20.

FIG. 16 provides a top view of inventive tank system 200.

FIG. 17 provides a bottom view of inventive tank system 200.

DESCRIPTION OF THE PREFERRED EMBODIMENTS

Figure 4:
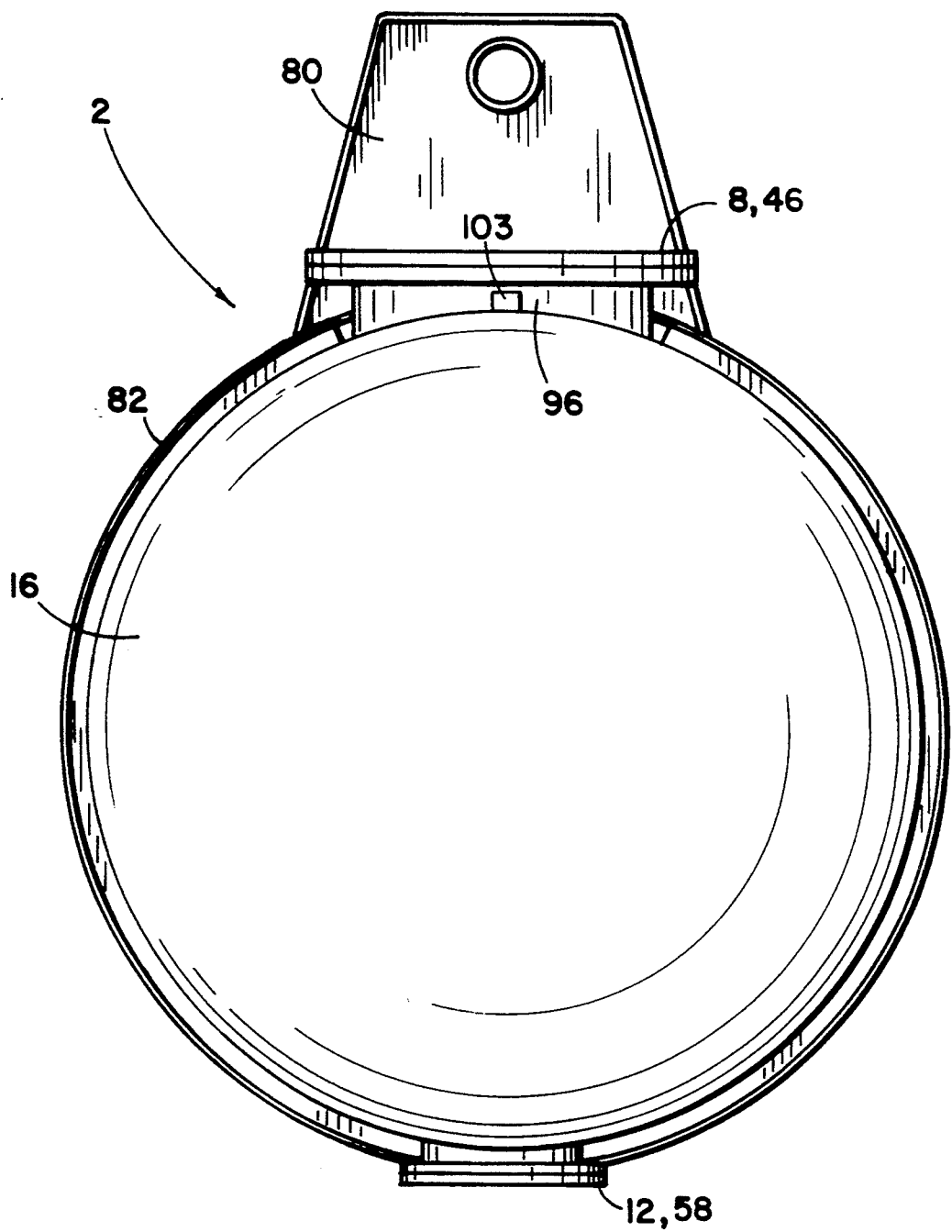
FIG. 4 provides an elevational end view of inventive tank system 2.
Figure 5:
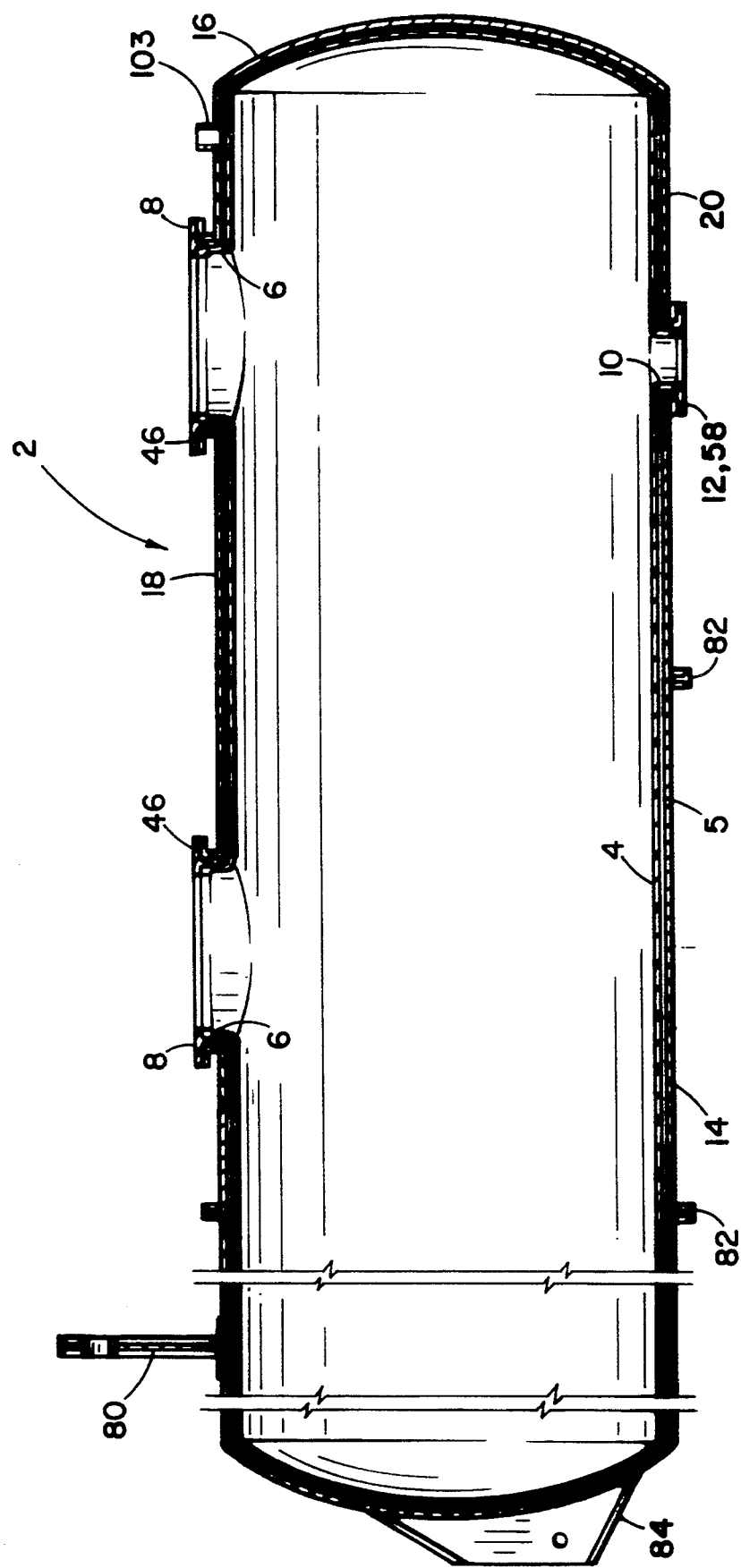
FIG. 5 provides a cutaway elevational side view of inventive tank system 2.

An embodiment 2 of the tank system provided by the present invention is depicted in FIGS. 1–14. Inventive tank system 2 comprises an elongate plastic inner tank 4 covered by a metal shell assembly 5.

Plastic tank 4 is preferably formed from a polyolefin material. Plastic tank 4 is most preferably formed from a polyolefin material such as high density cross-linked polyethylene which is highly compatible with acids and other corrosive well treating fluids. Plastic tank 4 is preferably formed by a rotational molding process of the type disclosed in U.S. Pat. No. 4,625,896, the entire disclosure of which is incorporated herein by reference. However, rather than being directly formed in a metal tank, plastic tank 4 is preferably formed using a mold which can be readily dismantled from tank 4 when the molding process is complete.

Plastic tank 4 includes two top fittings 6 and a suction fitting 10. Top fittings 6 and suction fitting 10 are preferably formed in plastic tank 4 during the rotational molding process. As shown in FIG. 7, each of top fittings 6 preferably includes an outer radial end 22, a groove 24 formed in outer radial end 22 for receiving an O-ring 26, and a threaded portion 28 formed around the exterior of each of top fittings 6. Suction fitting 10 preferably comprises an outer radial end 30 having a groove 32 formed therein for receiving an O-ring 34. Suction fitting 10 further comprises an exterior threaded portion 36 formed around the exterior of suction fitting 10.

Inventive tank system 2 preferably also comprises plastic flange members 8 which are threadedly connectable to top fittings 6 and a plastic flange member 12 which is threadedly connectable to suction fitting 10. Plastic flange members 8 and 12 are preferably formed from the same material as plastic tank 4.

Each of plastic flange members 8 preferably comprises: a threaded bore 38 for threadedly receiving threaded portion 28 of a top fitting 6; a flange bore 40 adjacent threaded bore 38 and having an inside diameter smaller than the inside diameter of threaded bore 38; a radial inner surface 42 defined by the transition from threaded bore 38 to flange bore 40, radial inner surface 42 abutting outer radial end 22 of fitting 6 when threaded portion 28 of fitting 6 is fully received in threaded bore 38 of flange member 8; a groove 44 formed in radial inner surface 42 for sealingly receiving O-ring 26; and an exterior radial flange portion 46 extending outwardly from the top of flange member 8 and having bolt holes 48 formed therein.

Plastic flange member 12 comprises: a threaded bore 50 for threadedly receiving threaded portion 36 of suction fitting 10; a flange bore 52 adjacent threaded bore 50, flange bore 52 having an inside diameter smaller than the inside diameter of threaded bore 50; a radial inner surface 54 defined by the transition from threaded bore 50 to flange bore 52, inner surface 54 being operable for abutting outer radial end 30 of suction fitting 10 when threaded portion 36 of suction fitting 10 is fully received in threaded bore 50 of flange member 12; a groove 56 formed in radial inner surface 54 for sealingly receiving O-ring 34; and an exterior radial flange portion 58 extending outwardly from the bottom of flange member 12 and having bolt holes 60 formed therein.

Metal shell assembly 5 comprises: a primary shell piece 14, a top shell insert 18, a bottom shell insert 20, and a shell end piece 16. Although items 14, 18, 20, and 16 can generally be formed from any common metallic material of construction, items 14, 18, 20, and 16 are preferably formed from stainless steel.

Primary shell piece 14 is a hollow elongate member sized for receiving plastic inner tank 4. The interior shape of primary shell piece 14 corresponds with the exterior shape of plastic tank 4 so that, when plastic tank 4 is received in primary shell piece 14, the exterior surface of plastic tank 4 is positioned in close proximity to the interior surface of shell piece 14.

As used herein and in the claims, the term "close proximity" is intended to indicate a tight fit. Any clearance originally present between the exterior surface of plastic tank 4 and the interior surfaces of shell components 14, 18, 20, and 16 is preferably only that which is necessary to (1) allow plastic tank 4 to be inserted into primary shell piece 14, (2) allow shell inserts 18 and 20 and end piece 16 to be matched with primary shell piece 14 when plastic tank 4 is positioned inside primary shell piece 14, and (3) account for common minor variations (e.g., out-of-roundedness) which can be present in standard rotationally molded plastic tanks of the type preferred for use in the present invention. Any gap originally present between the interior surface 4 of primary shell piece 14 and the exterior surface of plastic tank should not exceed an average value of about 0.5 inches around the perimeter of tank 4.

In order to ensure that plastic tank 4 is held firmly against the ends and the cylindrical interior surface of shell assembly 5 and thereby minimize the ability of plastic tank 4 to move within shell assembly 5, various items can be positioned inside shell assembly 5 to fill any gaps originally existing between plastic tank 4 and shell assembly 5 and to otherwise urge plastic tank 4 against the interior surface of shell assembly 5. For example, shims or metal strips 61 can be attached longitudinally to the cylindrical interior surface of primary shell piece 14 such that, as tank 4 is inserted into shell piece 14, the longitudinal attachments urge the lower exterior surface of tank 4 towards, and preferably against, the lower interior cylindrical surface of primary shell piece 14. Additionally, foam rubber or some other packing material can be placed in the interior end of primary shell piece 14 such that, when end piece 16 is connected to primary shell piece 14, the end of tank 4 is urged firmly against the interior surface of end piece 16.

Primary shell piece 14 preferably includes: an opening 68 in the end thereof for receiving plastic tank 4; an edge 70 defining end opening 68; an upper opening 72 for receiving top fittings 6 as tank 4 is inserted into primary shell piece 14; an edge 74 defining upper opening 72; a lower opening 76 for receiving suction fitting 10 of plastic tank 4 as tank 4 is inserted into primary shell piece 14; an edge 78 defining lower opening 76; a roll protection attachment 80 connected to the upper exterior surface of primary shell piece 14; structural support bands 82 extending around the cylindrical exterior of primary shell piece 14; and a standard lift attachment 84 connected to the exterior of the closed end of primary shell piece 14.

Top shell insert 18 comprises an elongate curved plate 86 having a radius of curvature corresponding to the radius of curvature of the cylindrical portion of primary shell piece 14. Elongate curved plate 86 includes curved lateral edges 88 and 90 and longitudinal straight edges 92. Lateral edge 88 and longitudinal edges 92 of shell insert 18 correspond to edges 74 of primary shell piece upper opening 72 such that shell insert 18 can be placed in upper opening 72 and then connected to primary shell piece 14 by welding edges 88 and 92 to edges 74. The interior shape of top insert 18 corresponds to the exterior cylindrical shape of plastic tank 4 such that, when tank 4 is positioned in primary shell piece 14 and top shell insert 18 is positioned in upper opening 72, the exterior surface of tank 4 is positioned in close proximity to the interior surface of insert 18.

Top shell insert 18 further includes apertures 94 extending therethrough for receiving top fittings 6 of plastic tank 4, Flange assemblies 96 having apertures 94 extending therethrough are also preferably connected to the exterior surface of plate 86. Each of flange assemblies 96 preferably comprises: a flange neck 98 which is connected to plate 86 and a flange portion 100 extending radially outward from the upper end of flange neck 98. Flange portion 100 includes an upper radial surface 101 and has bolt holes 102 extending therethrough.

A small port 103 can optionally be included in top shell insert 18 for snaking a hose down between the exterior end surface of plastic tank 4 and the interior surface of shell end piece 16 in order to inject urethane into any gaps remaining between tank 4 and end piece 16. Port 103 will preferably be an internally threaded, small diameter collar which is welded in plate 86.

Bottom shell insert 20 comprises an elongate curved plate 104 having curved lateral edges 106 and 108 and longitudinal straight edges 110. Plate 104 has an aperture 112 formed therein for receiving suction fitting 10 of plastic tank 4. Edges 106 and 110 of bottom shell insert 20 correspond to edges 78 of the lower opening of primary shell piece 14 such that bottom shell insert 20 can be placed in lower opening 76 and edges 106 and 110 can be welded to edges 78 of primary shell piece 14. The interior shape of bottom shell insert 20 corresponds to the exterior shape of plastic tank 4 such that, when plastic tank 4 is placed in primary shell piece 14 and bottom shell insert 20 is placed in lower opening 76, the exterior surface of plastic tank 4 is positioned in close proximity to the interior surface of bottom shell insert 20.

A collar 114 having aperture 112 extending therethrough is preferably connected to the exterior surface of plate 104. Collar 114 includes an outer radial surface 116 having bolt holes 118 extending therein.

Shell end piece 16 comprises a curved interior surface and a circular edge 122. Circular edge 122 corresponds with edge 70 of primary shell piece 14, curved lateral edge 90 of top shell insert 18, and curved lateral edge 108 of bottom shell insert 20 such that shell end piece 16 can be placed over end opening 68 of primary shell piece 14 and circular edge 122 can be welded to edges 70, 90, and 108. The interior surface of shell end piece 16 has a shape corresponding to the shape of the end of plastic tank 4 such that, when plastic tank 4 is placed in primary shell piece 14 and shell end piece 16 is secured over the end opening of primary shell piece 14, the exterior end of plastic tank 4 is positioned in close proximity to the interior surface of shell end piece 16.

In order to protect plastic tank 4 and to prevent plastic tank 4 from being damaged when top shell insert 18, bottom shell insert 20, and shell end piece 16 are welded to primary shell piece 14, thin metal strips 124 can be positioned between the exterior surface of tank 4 and the shell component edges of metal shell assembly 5. With the exception of circular metal strip 124A, metal strips 124 are preferably attached to the interior surface of primary shell piece 14 before plastic tank 4 is inserted therein. Metal strips 124 are preferably positioned such that they lie between the exterior surface of tank 4 and all of edges 70, 74, 78, 88, 90, 92, 106, 108, 110, and 122 of metal shell assembly 5.

Alternatively, or in addition to the use of metal strips 124, plastic tank 4 can be protected during the welding of metal shell assembly 5 by (a) providing molded depressions 126 in the exterior surface of plastic tank 4 which are positioned to lie beneath and coincide with the welding edges of shell assembly and thereby provide a gap between the exterior surface of tank 4 and the hot edges of shell assembly 5 and/or (b) placing an insulating material between plastic tank 4 and the welding edges of shell assembly 5. If depressions 126 are used, the depressions are preferably sized to provide a gap of at least about 0.25 inches between the exterior surface of tank 4 and the welding edges of shell assembly 5.

Examples of insulating materials suitable for use in the present invention include materials such as CERAMA-SEAL marketed by Therma-Cote, Inc. of Anchorage, Ak. which are brushed, sprayed, or otherwise applied in fluid (e.g., liquid) form to the exterior surface of plastic tank 4. Other insulating materials suitable for use in the present invention include insulating cloth materials such as FLEXWEAVE 1000 asbestos-free woven fiberglass cloth marketed by The Carborundum Company, Niagara Falls, N.Y.

In accordance with the above, inventive tank system 2 can be assembled by: (1) placing plastic tank 4 inside primary shell piece 14 such that top fittings 6 of tank 4 are received in upper opening 72 of shell piece 14 and suction fitting 10 is received in lower opening 76 of shell piece 14; (2) placing shell end piece 16 over end opening 68 of primary shell piece 14; (3) welding circular edge 122 of end piece 16 to opening edges 70 of primary shell piece 14; (4) placing top shell insert 18 in upper opening 72 such that top fittings 6 of plastic tank 4 are received in apertures 94 of top shell insert 18; (5) placing bottom shell insert 20 in lower opening 76 of shell piece 14 such that suction fitting 10 of plastic tank 4 is received in aperture 112 of bottom shell insert 20; (6) welding edges 88, 90, and 92 to edges 74 of primary shell piece 14 and circular edge 122 of end piece 16; (7) welding edges 106, 108, and 110 of bottom shell insert 20 to edges 78 of primary shell piece 14 and circular edge 122 of end piece 16; (8) threadedly connecting plastic flange members 8 to top fittings 6 of tank 4 such that radial inner surfaces 42 of flange members 8 sealingly engage outer radial ends 22 of top fittings 6 and the exterior radial flange portions 46 of flange members 8 extend over the upper radial flange surfaces 101 of top shell insert 18; and (9) threadedly connecting plastic flange member 12 to suction fitting 10 of plastic tank 4 such that radial inner surface 54 of plastic flange member 12 sealingly engages outer radial end 30 of suction fitting 10 and the exterior radial flange portion 58 of plastic flange member 12 extends over outer radial surface 116 of bottom shell insert 20.

Bolt holes 48 and 60 of plastic flange members 8 and 12 are preferably formed after flange members 8 and 12 are threadedly connected to fittings 6 and 10 so that these bolt holes will correspond to the bolt holes 102 and 118 included in top and bottom shell inserts 18 and 20. With plastic flange members 8 and 12 thus connected to fittings 6 and 10 of plastic tank 4 and extending over radial surfaces 101 and 116 of metal shell assembly 5, conduits, manway hatches, and other items can be conveniently connected to plastic tank 4 and shell assembly 5 such that shell assembly 5 is completely isolated from the material contained in plastic tank 4.

Figure 15:
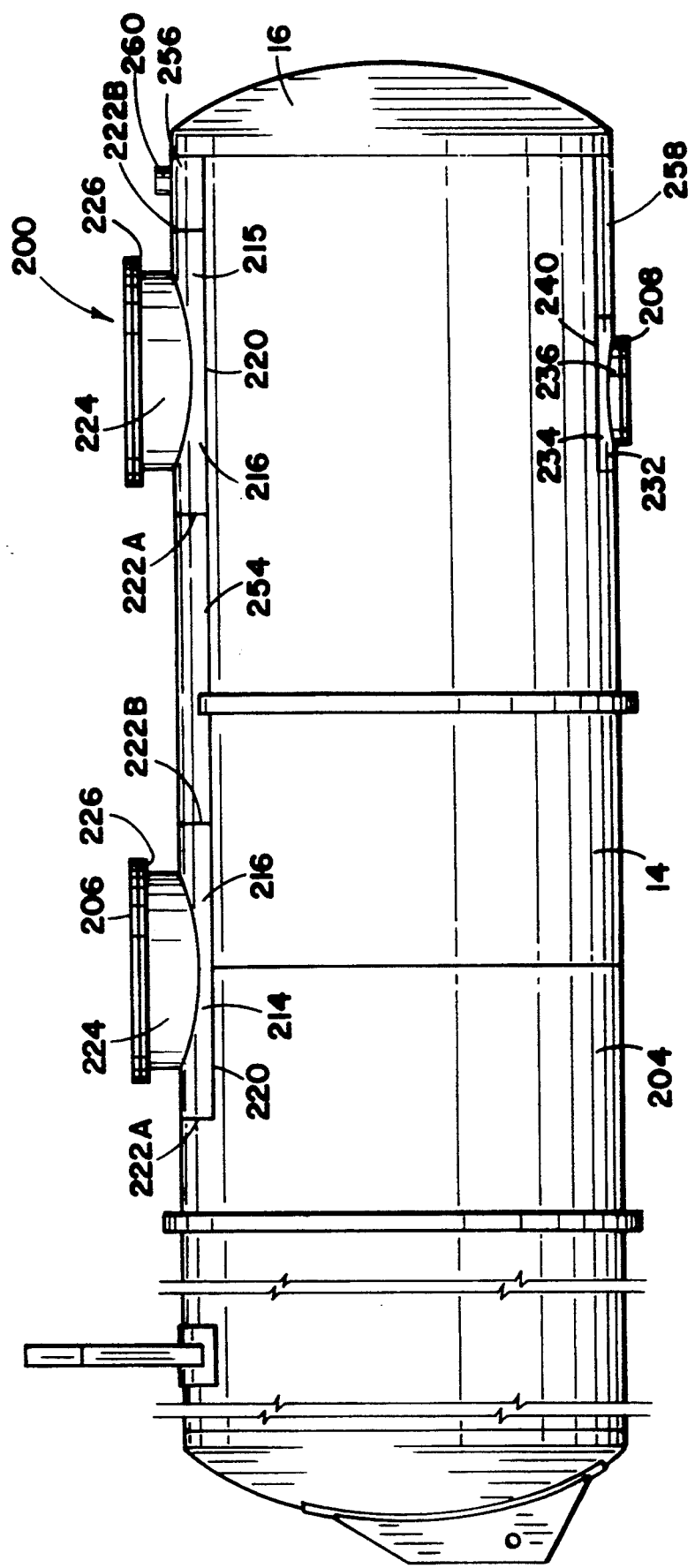
FIG. 15 provides an elevational side view of a second embodiment 200 of the tank system of the present invention.
Figure 18:
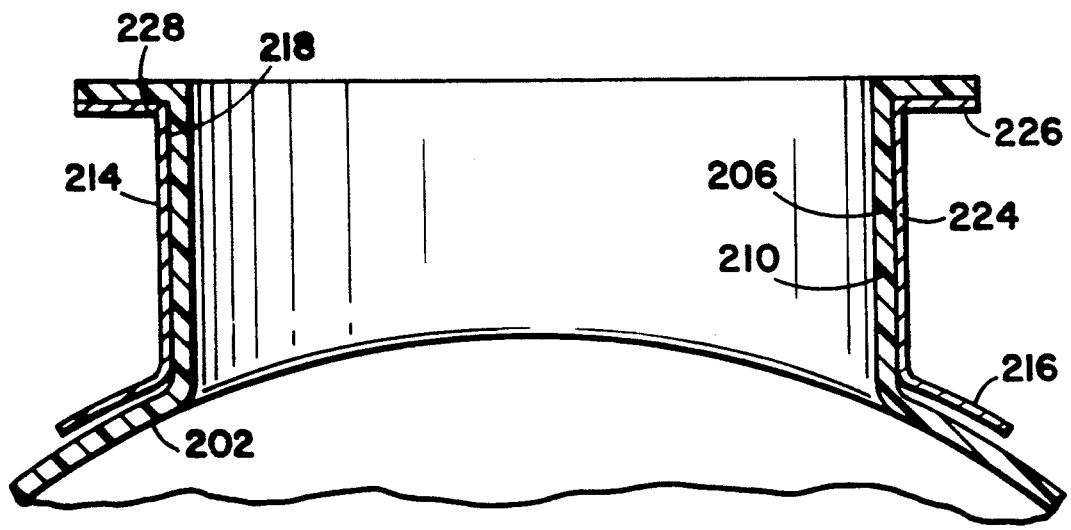
FIG. 18 provides a cutaway elevational side view of a top fitting 206 included in inventive tank system 200.
Figure 19:
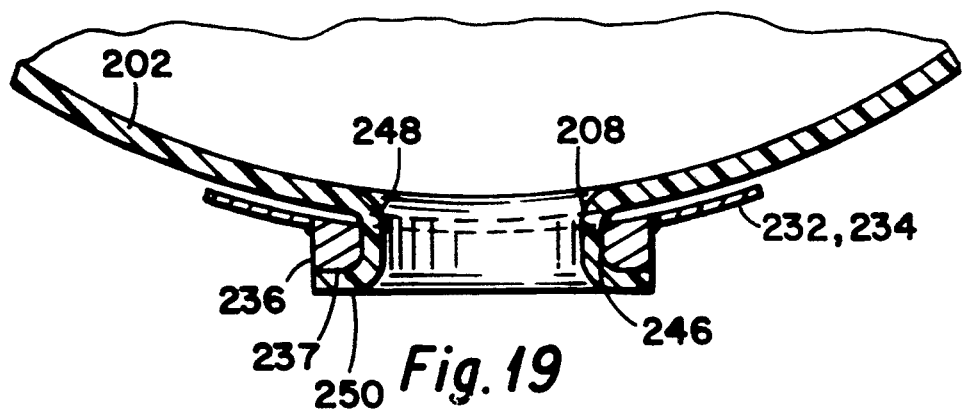
FIG. 19 provides a cutaway elevational side view of a bottom fitting 208 included in inventive tank system 200.

A second embodiment 200 of the inventive tank system is depicted in FIGS. 15-19. Inventive tank assembly 200 comprises a plastic inner tank 202 and a metal shell assembly 204. Metal shell assembly 204 comprises a primary shell piece 14 and a shell end piece 16 which are essentially identical to the primary shell piece 14 and shell end piece 16 of inventive apparatus 2.

Plastic tank 202 is identical to plastic tank 4 of inventive apparatus 2 with the exception that the structures of the top fittings 206 of plastic tank 202 and the suction fitting 208 of plastic tank 202 differ from the structures of top fittings 6 and suction fitting 10 of plastic tank 4.

Each of top fittings 206 is a continuous flanged fitting which is integrally formed in plastic tank 202. Each of top fittings 206 comprises a cylindrical neck 210 and a flange portion extending radially outward from the outer end of cylindrical neck 210. Top fittings 206 are directly formed around top metal fittings 214 and 215 by inserting top metal fittings 214 and 215 into the mold used for forming plastic tank 202. Each of top metal fittings 214 and 215 includes a curved plate 216 having an aperture 218 extending therethrough. The radius of curvature of each curved plate 216 is essentially identical to the radius of curvature of the cylindrical portion of primary shell piece 14. Each curved plate 216 has two straight longitudinal edges 220 and two curved lateral edges 222A and 222B. Each of metal fittings 214 and 215 further comprises a cylindrical neck 224 extending from the exterior surface of plate 216 and a flange portion 226 extending radially outward from the outer end of cylindrical neck 224. Aperture 218 extends through neck 224 and flange 226. Each flange portion 226 includes an upper radial surface 228 and has bolt holes extending therethrough. During the process of molding plastic tank 202, top fittings 206 are formed in and through top metal fittings 214 and 215 as the plastic material of tank 202 coats the interior surface of curved plate 216, the interior surface of cylindrical neck 224, and the upper radial surface 228 of metal flange 226.

Suction fitting 208 of plastic tank 202 is formed by inserting a bottom metal fitting 232 in the mold used for forming plastic tank 202. Bottom metal fitting 232 comprises: a curved plate 234 having a radius of curvature corresponding to the radius of curvature of primary shell piece 14 and a collar 236 extending from the outer surface of curved plate 234. Collar 236 includes an outer radial surface 237 having bolt holes formed therein. Curved plate 234 has longitudinal straight edges 240 and curved edges 242 and 244. Further, collar 236 and curved plate 234 have an aperture 246 extending therethrough.

During the tank molding process, suction fitting 208 of plastic tank 202 is formed as the plastic material used to form plastic tank 202 coats both the interior surface of collar 236 and radial surface 237 of collar 236. Thus, suction fitting 208 is a continuous plastic fitting which is integrally formed with plastic tank 202 and comprises a plastic neck 248 which extends through collar 236 and a flange portion 250 which extends radially outward over surface 237 of collar 236. Bolt holes 252 corresponding to the bolt holes of metal fitting 232 are formed in plastic suction fitting 208.

Inventive tank system 200 is generally assembled in the same manner as inventive tank system 2 except that: (1) longitudinal edges 220 of top metal fittings 214 and 215 and curved lateral edge 222A of top metal fitting 214 are welded to upper opening edge 74 of primary shell piece 14; (2) longitudinal straight edges 240 and curved edge 242 of bottom metal fitting 232 are welded to lower opening edge 78 of primary shell piece 14; (3) curved metal plates 254 and 256 are inserted in the remaining portions of upper opening 72 of primary shell piece 14 and are welded to primary shell piece 14, shell end piece 16, and plates 216 of top metal fittings 214 and 215; and (4) a curved plate 258 is inserted in the remaining portion of lower opening 76 of primary shell piece 14 and is welded to primary shell piece 14, shell end piece 16, and curved plate 234 of bottom metal fitting 232.

A small port 260 can optionally be included in top plate 258 for snaking a hose down between the exterior end surface of plastic tank 202 and the interior surface of shell end piece 16 in order to inject urethane into any gaps remaining between tank 202 and end piece 16. Port 260 is essentially identical to port 103 described hereinabove.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of forming a tank system wherein said tank system comprises a plastic tank covered by a metal shell and said plastic tank has an exterior surface and an exterior shape, said method comprising the steps of:
   (a) covering a first portion of said plastic tank with a first metal shell piece, said first metal shell piece having an interior shape and an interior surface, said interior shape of said first metal shell piece corresponding to the exterior shape of said first portion of said plastic tank such that the exterior surface of said first portion of said plastic tank is in close proximity to said interior surface of said first metal shell piece, and said first metal shell piece having a first edge;

(b) covering a second portion of said plastic tank with a second metal shell piece, said second metal shell piece having an interior shape and an interior surface, said interior shape of said second metal shell piece corresponding to the exterior shape of said second portion of said plastic tank such that the exterior surface of said second portion of said plastic tank is in close proximity to said interior surface of said second metal shell piece, and said second metal shell piece having a second edge corresponding to said first edge such that, when said first and second shell pieces are placed over said plastic tank, said second edge is positioned adjacent said first edge; and (c) after steps (a) and (b), welding said first and second shell pieces together along said first and second edges, said plastic tank having a plastic fitting integrally formed in said second portion thereof, said second shell piece having an aperture formed therein for receiving said plastic fitting, said second shell piece having an external radial surface, said aperture extending through said external radial surface, and wherein said second portion of said plastic tank is covered with said second shell piece in accordance with step (b) when said plastic tank and said plastic fitting are formed such that said plastic fitting is a continuous fitting extending through said aperture and over said external radial surface.

2. A method as described in claim 1 further comprising the step, prior to step (c), of placing a metal strip between the exterior surface of said plastic tank and said first and second edges.

3. A method as described in claim 1 further comprising the step, prior to step (c), of placing an insulating material between the exterior surface of said plastic tank and said edges.

4. A method as described in claim 3 wherein said insulating material comprises an insulating cloth.

5. A method as described in claim 3 wherein said insulating material is applied in fluid form to said exterior surface of said plastic tank.

6. A method as described in claim 1 wherein said plastic tank has a depression formed in the exterior surface thereof and said depression is positioned adjacent said first and second edges when said plastic tank is covered with said first and second shell pieces.

7. A method as described in claim 6 wherein the depth of said depression is such that said depression provides a gap of at least about 0.25 inches between the exterior surface of said plastic tank and said edges.

8. A method as described in claim 1 wherein said plastic tank is formed from high density cross-linked polyethylene.

9. A method as described in claim 8 wherein said first and second metal shell pieces are formed from stainless steel.

10. A method of forming a tank system wherein said tank system comprises a plastic tank covered by a metal shell and said plastic tank has an exterior surface and an exterior shape, said method comprising the steps of:

(a) covering a first portion of said plastic tank with a first metal shell piece, said first metal shell piece having an interior shape and an interior surface, said interior shape of said first metal shell piece corresponding to the exterior shape of said first portion of said plastic tank such that the exterior surface of said first portion of said plastic tank is in close proximity to said interior surface of said first metal shell piece, and said first metal shell piece having a first edge;

(b) covering a second portion of said plastic tank with a second metal shell piece, said second metal shell piece having an interior shape and an interior surface, said interior shape of said second metal shell piece corresponding to the exterior shape of said second portion of said plastic tank such that the exterior surface of said second portion of said plastic tank is in close proximity to said interior surface of said second metal shell piece, and said second metal shell piece having a second edge corresponding to said first edge such that, when said first and second shell pieces are placed over said plastic tank, said second edge is positioned adjacent said first edge; and (c) after steps (a) and (b), welding said first and second shell pieces together along said first and second edges, said plastic tank having a plastic fitting integrally formed in said second portion thereof, said second shell piece having an aperture formed therein for receiving said plastic fitting, said second shell piece having an external radial surface, said aperture extending through said external radial surface, said second portion of said plastic tank being covered with said second shell piece in step (b) such that said plastic fitting extends into said aperture, said plastic fitting including a threaded portion, and said method further comprising the step, after step (b), of threadedly connecting a plastic flange member, said plastic flange member having a flange portion and a threaded portion corresponding to said threaded portion of said plastic fitting, to said plastic fittings such that said flange portion extends over said external radial surface of said second shell piece.

11. A method as described in claim 10 further comprising the step, prior to step (c), of placing a metal strip between the exterior surface of said plastic tank and said first and second edges.

12. A method as described in claim 10 further comprising the step, prior to step (c), of placing an insulating material between the exterior surface of said plastic tank and said edges.

13. A method as described in claim 12 wherein said insulating material comprises an insulating cloth.

14. A method as described in claim 12 wherein said insulating material is applied in fluid form to said exterior surface of said plastic tank.

15. A method as described in claim 10 wherein said plastic tank has a depression formed in the exterior surface thereof and said depression is positioned adjacent said first and second edges when said plastic tank is covered with said first and second shell pieces.

16. A method as described in claim 15 wherein the depth of said depression is such that said depression provides a gap of at least about 0.25 inches between the exterior surface of said plastic tank and said edges.

17. A method as described in claim 10 wherein said plastic tank is formed from high density cross-linked polyethylene.

18. A method as described in claim 17 wherein said first and second metal shell pieces are formed from stainless steel.

* * * * *